United States Patent
Ichikawa et al.

(10) Patent No.: US 6,387,335 B1
(45) Date of Patent: *May 14, 2002

(54) SOOT TREATING APPARATUS FOR DUST COLLECTOR

(75) Inventors: Jun Ichikawa; Toshio Igarashi, both of Tokyo (JP)

(73) Assignee: Hino Motors, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,391

(22) Filed: Oct. 13, 1998

(51) Int. Cl.$^7$ ............................ F01N 3/02; F01N 3/021; F01N 3/023; F01N 3/027

(52) U.S. Cl. ..................... 422/171; 422/172; 422/173; 422/174; 422/178; 55/523

(58) Field of Search ................................. 422/171, 172, 422/176, 178, 173, 174; 55/523, 282

(56) References Cited

U.S. PATENT DOCUMENTS 5,655,212 A * 8/1997 Sekhar et al. .................. 60/274

FOREIGN PATENT DOCUMENTS

| EP | 0 327 653 | | 8/1989 |
|----|-----------|---|--------|
| EP | 808998 | * | 11/1997 |
| JP | 62-80416 | | 4/1987 |
| JP | 5-30413 | | 4/1993 |
| JP | 6-317137 | | 11/1994 |
| WO | WO 95/23280 | | 8/1995 |

* cited by examiner

*Primary Examiner*—Hien Tran
(74) *Attorney, Agent, or Firm*—Reed Smith LLP

(57) ABSTRACT

A hopper for collecting soot included in the exhaust gasses is disposed on a lower portion of a filter. There is a backwashing means for introducing a compressed air into the filter from the exhaust gas-downstream side through an air conduit and dropping the soot deposited in the filter on to the hopper. A combustion pipe is disposed on a lower end of the hopper, and an air nozzle for supplying a combustion air is disposed in the combustion pipe. A combustion medium which is capable of collecting the soot arriving at the combustion pipe and the burned ashes and of letting the combustion air pass therethrough is inserted detachably into the combustion pipe and arranged on a porous ceramic plate. A heater is disposed around the combustion pipe for burning the soot which is collected by the combustion medium. The soot is burned completely at the combustion medium, and most of the ashes remain at the combustion medium and the rest of the ashes is completely collected by the plate. Whereby the combustion gasses can be directly discharged to the atmosphere. The ashes can be easily dumped by renewing the combustion medium and the plate.

2 Claims, 2 Drawing Sheets

SOOT TREATING APPARATUS FOR DUST COLLECTOR

BACKGROUND OF THE INVENTION

1. Field of the Invention

This invention relates to a soot treating apparatus for a dust collector, which is capable of collecting soot from exhaust gasses of engines equipped for the performance tests, before the exhaust gasses are discharged to the atmosphere. More particularly, this invention relates to an apparatus for burning soot collected by the dust collector.

2. Description of the Related Art

The present inventors filed the patent application which is directed to this kind of the soot treating apparatus (Unexamined Published Japanese Patent Application No. 6(1994)-317137). As shown in FIG. 2, this apparatus comprises a filter 2 disposed in an exhaust gas duct 1 through which the exhaust gasses pass, and a hopper 3 disposed on a lower portion of the filter 2. A normally-open type damper 1a is disposed in the duct 1 on an inlet side of the filter 2, and a normally-open type damper 1b is disposed in the duct 1 on an outlet side of the filter 2. In the duct 1 on an exhaust gas-downstream side of the filter 2 is disposed a backwashing air conduit 4 for introducing a compressed air thereto, and a normally-closed type valve 4a is disposed in the air conduit 4. A combustion pipe 5 is connected to a lower end of the hopper 3, and a heater 6 is disposed around the combustion pipe 5. A combustion medium 7 is inserted into the combustion pipe 5 where the heater 6 is disposed. A chamber 8 is disposed on a lower end of the combustion pipe 5. And a filter 8a is disposed in the chamber 8. An air blowing pipe 9a is disposed on an upper portion of the combustion pipe 5, and an air blowing pipe 9c is connected to the air blowing pipe 9a through a valve 9b. A blower 9e is connected to the air blowing pipe 9c through a heat exchanger 9d which is disposed around the combustion pipe 5.

When the soot is burned by the above-mentioned apparatus, the combustion medium 7 in the combustion pipe 5 is heated up by the heater 6. The damper 1b is closed, and the blower 9e is operated. After that, the valve 4a is opened only in a short time, then the compressed air is blown against the filter 2 through the air conduit 4. The soot deposited in the filter 2 is dropped on to the hopper 3. The soot 10 deposited on to the hopper 3 is transferred to the combustion pipe 5 by the air blown from the air blowing pipe 9a. The soot 10 transferred to the combustion pipe 5 is collected by the combustion medium 7, where the soot is burned due to the heat of the heater 6 to be made into the ashes. The combustion medium 7 allows the ashes of the soot 10 and air to pass therethrough. Most of the ashes are collected in the chamber 8, whereby the air including the ashes and blown from the air blowing pipe 9a is purified by the filter 8a to thereby be discharged to the atmosphere.

In the conventional soot treating apparatus for the dust collector, most of the ashes of the soot passing through the combustion medium store in the chamber and the rest of the ashes is collected by the air filter. Accordingly, there has been a problem that the air filter is incapable of collecting the ashes effectively and completely. Also, in the above-mentioned apparatus, it has been troublesome to take out the ashes collected in the chamber therefrom.

SUMMARY OF THE INVENTION

It is, therefore, an object of the invention to provide a soot treating apparatus for a dust collector, which is capable of collecting the ashes of the soot effectively and completely burned by the combustion medium.

It is, another object of the invention to provide a soot treating apparatus for a dust collector, which is capable of discharging the combustion gasses directly to the atmosphere, and dumping the collected ashes easily.

The invention according to a first embodiment is, as shown in FIG. 1, directed to a soot treating apparatus for a dust collector, comprising a filter 12 disposed on a passage 11 through which exhaust gasses pass for collecting soot included in the exhaust gasses, a hopper 13 disposed on a lower portion of the filter 12, a backwashing means for introducing a compressed air into the filter through an exhaust gas-downstream side of the filter 12 to drop the soot deposited in the filter 12 on to the hopper 13, a combustion pipe 15 connected to a lower end of the hopper 13, an air supplying means for supplying a combustion air into the combustion pipe 15, a combustion medium 30 of heat-resistant porous ceramic inserted into the combustion pipe 15, which is capable of collecting the soot 10 arriving at the combustion pipe 15 and of letting the combustion air pass therethrough, a heater 16 disposed around the combustion pipe 15, being adapted to burn the soot collected by the combustion medium 30, a heat exchanger 17 disposed around the heater 16, and an air filter disposed on gas-downstream side of the combustion medium 30, which is capable of collecting the burned ashes coming from the combustion medium 30 and of letting the combustion gasses pass therethrough, wherein the air supplying means is comprised of an air supplying blower 18b, an air nozzle 18a for jetting an air toward the combustion medium 30 from a side of the hopper, and an air pipe passage 18c disposed so as to pass through the heat exchanger 17 for connecting the blower 18b and the air nozzle 18a to each other, characterised in that the combustion medium 30 is capable of collecting the burned ashes as well as the soot 10, and the air filter is comprised of a plate 31 of heat-resistant porous ceramic, which is detachably disposed on the gas-downstream end of the combustion medium 30 so as to cross with the combustion pipe 15, having pores of average diameter from 300 to 700 $\mu$m.

When the soot is burned to be treated, the soot deposited in the filter 12 by introducing the compressed air thereto by the air conduit 14 is dropped on to the hopper 13. The soot is adhered to the combustion medium 30 due to the combustion air supplied to the combustion pipe 15, and burned due to the heat of the heater 16. Most of the ashes generated due to the combustion remain in the combustion medium 30. The plate 31 prevents the combustion medium 30 from dropping from the combustion pipe 15, and also collects the rest of the ashes reliably which come from the combustion medium 30 after combustion. A clean air passing through the combustion medium 30 and the plate 31, which does not include the soot or the ashes, is discharged to the atmosphere. When the ability in which the combustion medium 30 can collects the soot or the ashes is lowered, the combustion medium 30 is renewed. Also, when the ability in which the plate 31 can collects the ashes is lowered, the plate 31 is renewed.

The air pipe passage 18c is warmed up by the heat exchanger 17 by using the heat of the heater 16 effectively. The combustion air is warmed through the air pipe 18c to be jetted from the air nozzle 18a as the warm wind. Whereby, the combustion efficiency of the soot at the combustion medium 30 is improved.

The combustion medium 30 is comprised of heat-resistant porous ceramic having pores of average diameter from 20 to 700 μm. As porous ceramic, there are exemplified alumina and cordierite, etc., which are greater in heat-resistance. It is preferable that porous ceramic is of a pellet-like one or a chip-like one or a chip-like one which is greater in specific surface area. Otherwise, porous ceramic may be of a honeycomb-like one. The former pellet-like or chip-like porous ceramic has preferably pores of average diameter from 50 to 150 μm, more preferably 100 μm. The latter honey-comb-like porous ceramic has preferably pores of average diameter from 400 to 600 μm, more preferably 500 μm.

As described above, according to the invention, the soot which is dropped from the filter can be burned effectively by the short combustion pipe, so that all the soot can be made into the ashes. As a result, the ashes are less in harm compared with the soot, then the volume thereof becomes 1/100 of the soot. Since most of the ashes are remained in the combustion medium and the rest of the ashes is collected by the plate, the combustion gasses can be directly discharged to the atmosphere. Also, the ashes can be dumped easily by renewing the combustion medium and the plate.

DESCRIPTION OF THE PREFERRED EMBODIMENTS

Figure 1:
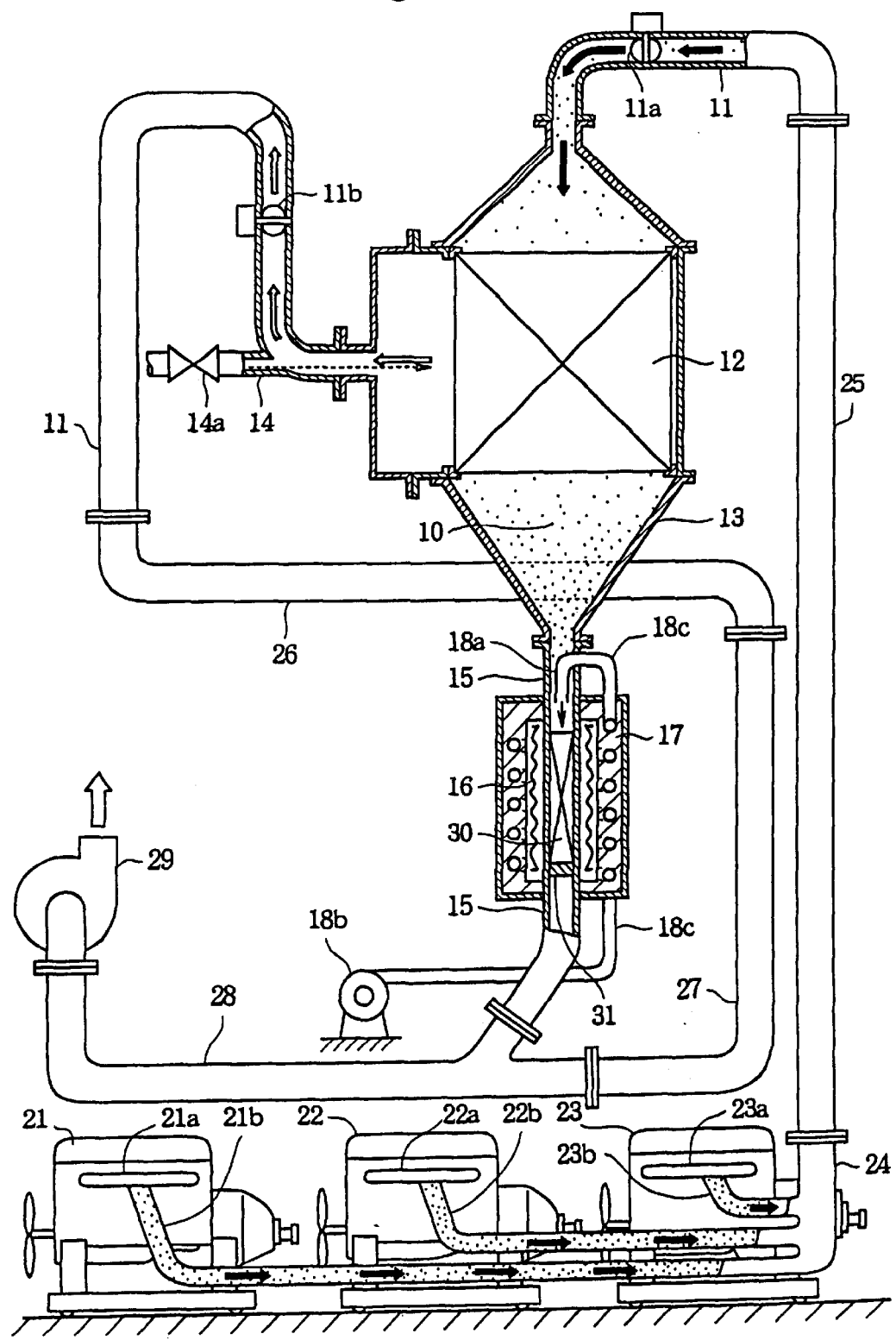
FIG. 1 is a constructional view of a soot treating apparatus for a dust collector according to the invention.
Figure 2:
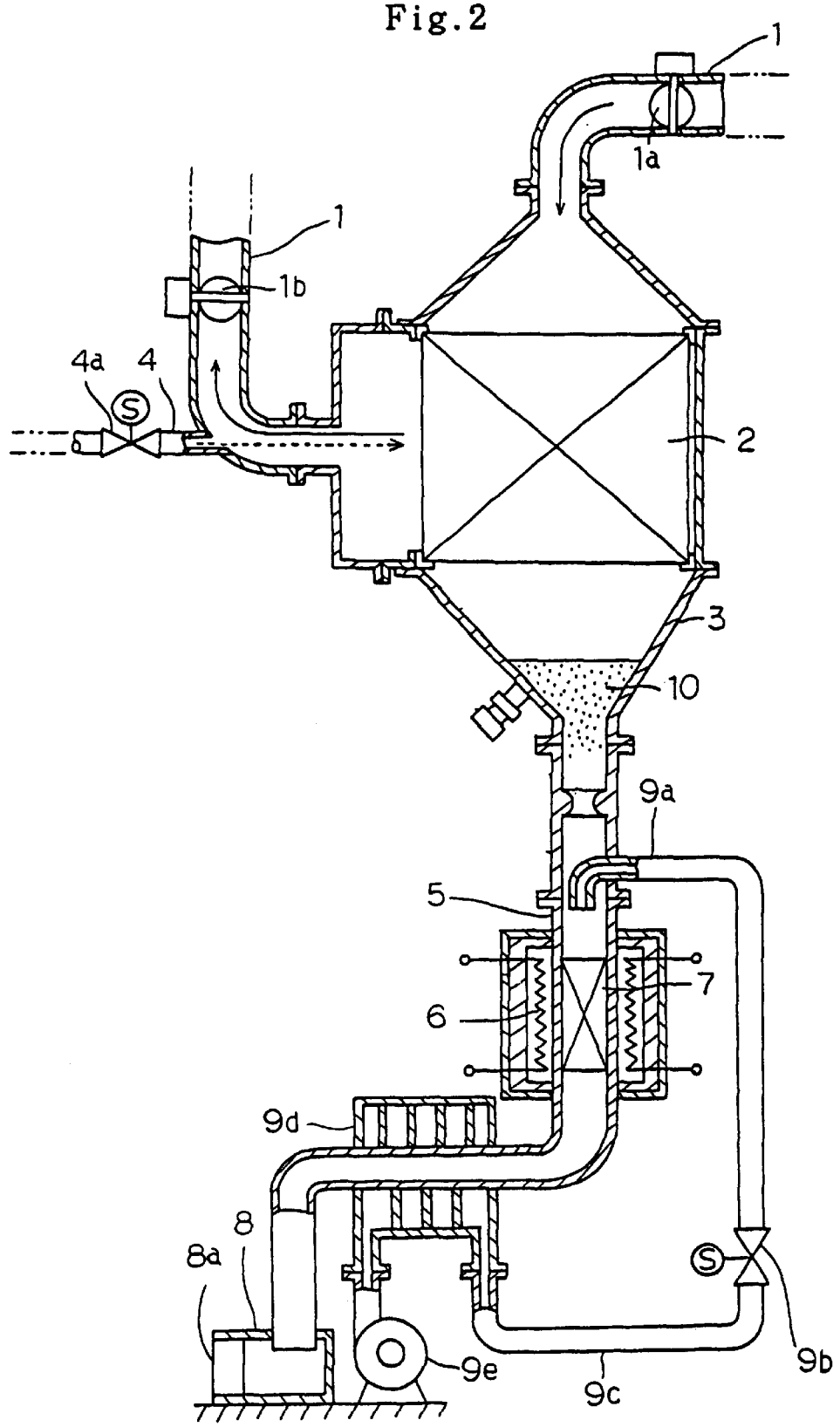
FIG. 2 is a constructional view of a conventional soot treating apparatus for a dust collector, which corresponds to that of FIG. 1.

One embodiment of the invention will be described hereinafter with reference to the drawing.

As shown in FIG. 1, there are equipped a plurality of diesel engines 21, 22 and 23 for the performance tests. Exhaust gas pipes 21b, 22b and 23b are connected to exhaust manifolds 21a, 22a and 23a of these engines 21, 22 and 23. The exhaust gas pipes 21b, 22b and 23b are connected to the exhaust gas duct 11 through exhaust gas ducts 24 and 25. A filter 12 is disposed on an intermediate portion of the exhaust gas duct 11. The filter 12 is made of porous ceramic, which is adapted to collect the soot included in the exhaust gasses of the engines 21 to 23. A normally-open type damper 11a which adjusts the inflow amount of the exhaust gasses to the filter 12 and a normally-open type damper 11b which adjusts the outflow amount of the exhaust gasses from the filter 12 are disposed on the exhaust gas duct 11, respectively. On the exhaust gas duct 11 between the filter 12 and the damper 11b is disposed a backwashing air conduit 14 for introducing a compressed air thereinto, and a normally-closed valve 14a is disposed on the air conduit 14. A suction fan 29 is connected to the exhaust gas duct 11 having the damper 11b, through the exhaust gas ducts 26, 27 and 28. A hopper 13 is disposed on a lower portion of the filter 12. An upper end of the combustion pipe 15 extending vertically is connected to a lower end of the hopper 13, and a lower end of the combustion pipe 15 is connected to an exhaust gas duct 28.

The combustion medium 30 is inserted into the combustion pipe 15 and fixed thereto. An air nozzle 18a for jetting the combustion air toward the combustion medium 30 is disposed in the combustion pipe 15 which is arranged on an upper portion of the combustion medium 30. The combustion medium 30 is capable of collecting the soot which arrives at the combustion pipe 15 and the burned ashes, and is comprised of heat-resistant porous ceramic having pores of average diameter of 100 μm. In this embodiment, the combustion medium 30 is inserted thereinto in a pellet-like condition in order to increase the specific surface area. The pellet is formed in a column body having diameter of 5 mm and length of 5 mm, for example. This combustion medium 30 is arranged on a disk-like plate 31 having thickness of 5 mm, which is inserted into and fixed to the combustion pipe 15. This plate 31 is comprised of porous ceramic having pores of average diameter of 500 μm, and is capable of collecting the ashes coming from the combustion medium 30.

A heater 16 is disposed around the combustion pipe 15, and is adapted to burn the soot collected by the combustion medium 30. In this embodiment, temperature of the heater 16 is set to a range of 800 to 900° C. There is provided a blower 18b for supplying an air to the above-mentioned air nozzle 18a. A heat exchanger 17 is disposed around the heater 16. In the heat exchanger 17 an air pipe passage 18c is apirally disposed in glass wool. The blower 18b and the air nozzle 18a are connected to each other through the air pipe passage 18c.

According to the soot treating apparatus for the dust collector constructed above, the exhaust gasses of the diesel engines 21 to 23 flow into the filter 12 through the exhaust gas ducts 24 and 25 by the operation of suction fan 29, where the soot included in the exhaust gasses are collected. Clean gasses passing through the filter 12 are discharged to the atmosphere through the exhaust gas ducts 11, 26, 27 and 28.

When the soot collected by the filter 12 is burned, a switch of the heater 16 is turned on to be heated up to 800 to 900° C. Next, the blower 18b is operated and the warm wind is blown against the combustion medium 30 through the air nozzle 18a, simultaneously the damper 11b is closed. After the damper 11b is closed, the valve 14a is opened in a short time, so that the compressed air introduced through the air conduit 14.

Whereby, the compressed air is blown against the filter 12, then the soot deposited in the filter 12 is dropped on to the hopper 13. The dropped soot 10 arrives at the combustion medium 30 easily by the warm wind jetted from the air nozzle 18a. Then the soot is collected by the combustion medium 30 which is heated by the heater 16, and burned there. Most of the ashes generated due to the combustion remain at the combustion medium 30 and the ashes coming from the combustion medium is collected by the plate 31.

The air which has burned the soot passes through the combustion medium 30 and the plate 31 to reach exhaust gas duct 28, and then discharged to the atmosphere together with the other exhaust gasses.

In a case where the above-operation is carried out repeatedly, then at least one of the combustion medium 30 or the plate 31 is detached and renewed.

What is claimed is:

1. A soot treating apparatus for a dust collector, comprising a porous ceramic filter disposed on a passage through which exhaust gasses pass for collecting soot included in the exhaust gasses, a hopper disposed on a lower portion of the filter, a backwashing means for introducing a compressed air into the filter through an exhaust gas-downstream side of the filter to drop the soot deposited in the filter on to the hopper, a combustion pipe connected to a lower end of the hopper, an air supplying means for supplying a combustion air into the combustion pipe, a combustion medium of heat-resistant porous ceramic inserted into the combustion pipe, which is capable of collecting the soot arriving at the combustion pipe and of letting the combustion air pass therethrough, a heater disposed around the combustion pipe, being adapted to burn the soot collected by the combustion medium, a heat exchanger disposed around the heater, and an air filter disposed on gas-downstream side of the combustion medium, which is also capable of collecting the burned ashes coming from the combustion medium and of letting the combustion air pass therethrough, wherein the air supplying means is comprised of an air supplying blower, an air nozzle for jetting an air toward the combustion medium from a side of the hopper, and an air pipe passage disposed so as to pass through the heat exchanger for connecting the blower and the air nozzle to each other, characterised in that the combustion medium is capable of collecting the burned ashes as well as the soot, and the air filter is comprised of a plate of heat-resistant porous ceramic and is detachably fixed within the combustion pipe at the gas-downstream end of the combustion medium, said porous ceramic plate having pores of average diameter from 300 to 700 $\mu$m.

2. The soot treating apparatus for a dust collector as claimed in claim 1, wherein the combustion medium is detachably arranged on the plate, and has pores of average diameter from 20 to 700 $\mu$m.

\* \* \* \* \*